(12) United States Patent
Antonietti et al.

(10) Patent No.: US 6,964,994 B1
(45) Date of Patent: Nov. 15, 2005

(54) POLYREACTIONS IN NON-AQUEOUS MINIEMULSIONS

(75) Inventors: Markus Antonietti, Bergholz-Rehbrücke (DE); Katharina Landfester, Berlin (DE); Mirjam Willert, Berlin (DE); Franca Tiarks, Lüdwigshafen (DE); Nina Bechthold, Essen (DE)

(73) Assignee: Max-Planck-Gesellschaft zur Forderung der Wissenschaften E.V., Munich (DE)

( * ) Notice: Subject to any disclaimer, the term of this patent is extended or adjusted under 35 U.S.C. 154(b) by 196 days.

(21) Appl. No.: 10/030,033

(22) PCT Filed: Jul. 20, 2000

(86) PCT No.: PCT/EP00/06952

§ 371 (c)(1),
(2), (4) Date: Mar. 28, 2002

(87) PCT Pub. No.: WO01/07487

PCT Pub. Date: Feb. 1, 2001

(30) Foreign Application Priority Data

Jul. 22, 1999 (DE) ................................ 199 34 517

(51) Int. Cl.$^7$ ................................................ G08F 2/24
(52) U.S. Cl. ...................... 524/804; 524/556; 524/590; 524/832; 524/839; 523/205; 523/440; 423/183.14

(58) Field of Search ................................ 524/590, 556, 524/804, 832, 839; 523/440, 205; 423/183.14

(56) References Cited

U.S. PATENT DOCUMENTS

| 4,521,317 | A | | 6/1985 | Candau et al. |
| 5,037,881 | A | * | 8/1991 | Kozakiewicz et al. ...... 524/812 |
| 5,686,518 | A | * | 11/1997 | Fontenot et al. ............ 524/458 |
| 5,739,378 | A | * | 4/1998 | Jenkins et al. .............. 560/181 |
| 5,770,172 | A | * | 6/1998 | Linehan et al. .......... 423/561.1 |
| 5,990,221 | A | * | 11/1999 | Dames et al. ................ 524/457 |

FOREIGN PATENT DOCUMENTS

| GB | 2118200 A | 10/1983 |
| GB | 2160879 A | 1/1986 |
| JP | 16-157668 | 11/1992 |

OTHER PUBLICATIONS

Polymerization in Nonaqueous Micromulsions, Schubert et al., , Institute of Electrical Engineers, Stevenage, GB. & Colloid & Polymer Science, Steinkopff, Sep. 1996, vol. 274, No. 9, pp. 875-883.

* cited by examiner

Primary Examiner—Tae H. Yoon
(74) Attorney, Agent, or Firm—Fulbright & Jaworski L.L.P.

(57) ABSTRACT

The invention relates to a method of conducting polymerization in nonaqueous miniemulsions.

21 Claims, 2 Drawing Sheets

POLYREACTIONS IN NON-AQUEOUS MINIEMULSIONS

The invention relates to a method of conducting polymerizations in nonaqueous miniemulsions.

Miniemulsion polymerization is an innovative process of heterophase polymerization which extends the use of conventional emulsion polymerization. Miniemulsions are dispersions of two substantially immiscible phases and, if desired, one or more surfactants, in which unusually small droplet sizes are realized. In the case of polymerization reactions in miniemulsions, an apolar monomer or a mixture of monomers and, if desired, a cosurfactant are usually dispersed in water using a surfactant and high shear fields to form droplets of the desired order of magnitude, which are colloidally stabilized by the added surfactant (Sudol and El-Aasser in: Emulsion Polymerization and Emulsion Polymers; Lovell, P.A.; El-Aasser, M.S., ed., Chichester (1997), 699). In such miniemulsions, the droplet size may grow further owing to collisions and fusions.

The German patent application 198 52 784.5-43 describes the osmotic stabilization of aqueous miniemulsions and microemulsions through the use of water-insoluble compounds as an emulsion-stabilizing component. By adding the water-insoluble substance to the oil phase, which is normally the disperse phase of the emulsion, an osmotic pressure is built up which counteracts the capillary pressure or Kelvin pressure built up with the surface tension of the emulsion droplets. This has the consequence of preventing or retarding Ostwald ripening of the emulsion droplets.

Nonaqueous dispersions are presently prepared primarily by inverse precipitation polymerization (Fengler and Reichert, Angew. Makromol. Chem. 225 (1995), 139), inverse suspension polymerization (Lee and Hsu, J. Appl. Polym. Sci. 69 (1998) 229; Omidian et al., Polymer 40 (1999), 1753) or inverse microemulsion polymerization (Bicak and Sherrington, Reactive Funct. Polym. 27 (1995), 155; Candau et al. J. Polym. Sci., Polym. Chem. Ed. 23 (1985), 193; Graillat et al., J. Polym. Sci., Polym. Chem. 24 (1986), 427; Barton et al., Angew. Makromol. Chem. 237 (1996) 99, Barton and Stillhammerova, Angew. Makromol. Chem. 237 (1996), 113). In these cases, however, there is a change in particle size and particle number during the polymerization; in other words, mass transport via the water phase determines the kinetics and the composition of the polymers and polymer latices prepared.

Inorganic nanoparticles are likewise prepared by reaction in inverse microemulsions (Pileni, Langmuir 13 (1997), 2366; Pileni, Supramol. Sci. 5 (1998), 321, Pileni; Cryst. Res. Techn. 33 (1998), 1155; Adair et al., Materials Sci. Eng. R 23 (1998), 139; Delfort et al., J. Colloid Interf. Sci. 189 (1997), 151), although the formulatability of an inverse microemulsion places considerable restrictions with regard to synthesis concentration and amount and nature of the surfactant. Generally speaking, the mass flow density of such inorganic particle syntheses is very low and at the boundary of what is technically sensible.

Imhof and Pine (J. Colloid Interf. Sci. 192 (1997), 368) describe increasing the stability of nonaqueous emulsions by adding small amounts of a water-insoluble oil. The emulsions described therein, however, have an average particle size of more than 1 $\mu$m, and so do not constitute microemulsions or miniemulsions.

Surprisingly it has been found that miniemulsions may also be formulated effectively in nonaqueous dispersion media, where they lead to well-defined and stable polymer products in the form of latices. Here, for example, a polar monomer such as acrylic acid or hydroxyethyl metacrylate is introduced into an apolar solvent, e.g., a hydrocarbon such as hexadecane or cyclohexane, and is stabilized with a typical surfactant which for inverse systems has an HLB of preferably less than 7, such as Aerosol OT (sulfosuccinic acid bis-2-ethylhexyl ester sodium salt), Span®80 (sorbitan monooleate, Fluka) or KLE3729 (Goldschmidt), for instance. As an osmotically active reagent, moreover, use is made of a strong hydrophile such as water and/or a salt, examples being salts of the monomers such as sodium acrylate. In this way, osmotically stabilized microemulsions are obtained whose polymerization gives rise to inverse dispersions of polar polymers which can be used further directly but from which the polymer may also be isolated in a substantially water-free form. In comparison to the known inverse precipitation polymerization, the method of the invention has the advantage that the particle size of the dispersion is easier to adjust and that in the case of a copolymerization a more homogeneous polymer structure, and respectively a crosslinking density which can be adjusted easily and homogeneously, can be achieved. In comparison to inverse suspension polymerization, much smaller particles can be prepared.

Polar organic solvents such as formamide, dimethylacetamide or glycols may also be used as dispersion media for preparing miniemulsions in which hydrophobic substances, e.g., polymerizable monomers, may be dispersed. Here again, use is made of surfactants having an HLB, preferred for O/W systems, of more than 7, such as sodium dodecyl sulfate, for instance, and of an osmotic control reagent, in this case a hydrophobic substance. In this way, even water-sensitive monomers may be polymerized in dispersion, examples being methacryloyl chloride, ketimines, or monomers containing isocyanate and epoxide. The resulting functional polymer products constitute important intermediates for the synthesis of further polymer products.

Inorganic polymerizations, as well, may be guided very advantageously in miniemulsions in organic nonaqueous media. Products obtained include inorganic polymers, glass-like nanoparticles or nanocrystals. Either an inverse or a reverse route may be chosen. In the case of the inverse synthesis route, aqueous solutions of inorganic—e.g., metallic—precursors are miniemulsified in hydrophobic organic solvents, the coreactant then being added by way of the continuous phase or admixed in the form of a second miniemulsion. In the case of the reverse synthesis route, a hydrophobic inorganic precursor, e.g., an organometallic compound, such as titanium tetraisobutoxide, is miniemulsified in a strongly polar organic solvent using a surfactant and an osmotic control substance, e.g., an ultrahydrophobic compound; any residual solubility of the precursor in the continuous phase is of minor significance. By adding a further coreactant, e.g., water, by way of the continuous phase, or in the form of a second miniemulsion, the polymerization is then initiated and leads to dispersed nanoparticles of controlled size and morphology.

The end products obtained are inorganic nanoparticles, with a considerably higher space-time yield than in the prior art. Furthermore, it is also possible to obtain particles which could not be prepared hitherto owing to the lack of corresponding stable emulsion systems in the prior art.

The invention therefore firstly provides a method of conducting polymerizations in nonaqueous miniemulsions which is characterized in that an emulsion of reactants of a polymerization is produced in a nonaqueous fluid dispersing medium, using a surfactant and an osmotically stabilizing component, and is reacted to give a dispersion of particles of the polymerization product in the medium.

Polymerizations in the sense of the present invention are reactions in which monomers or mixtures of monomers are reacted to polymers. One example of polymerizations are addition polymerizations, i.e., polymerizations which proceed steplessly without elimination of byproducts, examples being the preparation of acrylic and/or styrene polymers or copolymers of corresponding monomers or monomer mixtures.

Another example of polymerizations are polyaddition reactions, which proceed in stages without the elimination of byproducts, examples being the preparation of polyurethanes from polyfunctional hydroxy compounds and polyfunctional isocyanates, the preparation of polyureas from polyfunctional amines and polyfunctional isocyanates, and the preparation of polyepoxides from polyfunctional epoxides and polyfunctional amines, thiols and/or hydroxy compounds.

The polymerizations also include polycondensation reactions, which proceed in stages with elimination of byproducts, an example being unipolycondensations, which proceed with the participation of a single monomer, e.g., a hydroxycarboxylic acid or an amino acid, or in which two different monomers are involved, an example being the preparation of polyamides from polyfunctional carboxylic acids and polyfunctional amines or the preparation of polyesters from polyfunctional carboxylic acids and polyfunctional hydroxy compounds. Another example of polycondensation reactions are copolycondensations, in which more than two different monomers are involved. Other polymers too may be prepared by polycondensation from the corresponding monomers, e.g., polyimides, poly-carbonates, amino resins, phenolic resins, polysulfides or urea resins.

The miniemulsion in which the polymerization is conducted may be prepared by using high shear yields, e.g., by means of a rod-type ultrasonicator, a jet disperser or a microfluidizer. The emulsion droplets are preferably situated within the order of magnitude of from 20 to 1000 nm, in particular from 30 to 600 nm average particle diameter. In one embodiment of the invention, a miniemulsion is formed from a disperse phase of polar organic monomers in a continuous apolar organic phase which is substantially miscible with the polar phase. In this embodiment, the osmotically stabilizing components used comprise hydrophilic substances, especially water and/or salts, including salts of the polar monomers, e.g., salts of acrylic acid or methacrylic acid.

In another embodiment, a O/W miniemulsion is formed from a disperse phase of apolar organic monomers in a continuous polar organic phase, the two phases being substantially immiscible. In this case, osmotically stabilizing components used comprise hydrophobic substances which mix with the apolar phase and have a solubility in the polar phase of preferably less than $5 \times 10^{-5}$ g/l, with particular preference less than $5 \times 10^{-6}$ g/l, and most preferably less than $5 \times 10^{-7}$ g/l at room temperature. Examples thereof are hydrocarbons, especially volatile, optionally halogenated hydrocarbons, silanes, organosilanes, siloxanes, long-chain esters, oils such as vegetable oils, e.g., olive oil, hydrophobic dye molecules, blocked isocyanates, and also oligomeric addition polymerization, polycondensation, and polyaddition products.

The osmotically stabilizing components are added generally in an amount of from 0.1 to 40% by weight, preferably from 0.2 to 10% by weight, and with particular preference from 0.5 to 5% by weight, based on the overall weight of the emulsion.

Also added for the purpose of stabilizing the O/W emulsion are surfactants such as sodium dodecyl sulfate, cetyltrimethylammonium chloride or else polymeric surfactants, such as block copolymers of styrene and ethylene oxide, for example. The amount of surfactant is preferably in the range from 0.1 to 20% by weight, more preferably from 0.2 to 10% by weight, with particular preference from 0.5 to 5% by weight, based on the overall weight of the emulsion.

The surfactants and osmotically stabilizing components are preferably selected so as to be compatible with the resultant polymerization product. Thus it is possible to use substances which possess a high volatility and/or which are usefully employed in the context of any further use of the polymeric dispersion, e.g., as plasticizers, dye, etc., so that they may contribute positively to the target application. By varying the surfactants and/or the osmotically stabilizing components and/or their amounts in the reaction batch it is possible to adjust as desired the particle size of the emulsion and of the resultant polymer dispersion.

The polymerization of the miniemulsion may also be initiated in a known way; for example, by adding a catalyst—a free-radical initiator, for example—and by raising the temperature. In this case, the preferred starting point is a critically stabilized emulsion, and with particular preference a thermodynamically stable emulsion. In the case of emulsions stabilized osmotically in this way, it is possible to obtain dispersions of the polymerization product whose particle sizes has not altered undesirably relative to that of the reactants emulsion. The particles of the polymerization product have an average size of preferably from 10 to 1000 nm and with particular preference from 30 to 600 nm.

Furthermore, the method of the invention is also suitable for preparing multiphase nanohybrid particles, e.g., particles which comprise polymerization products and—encapsulated therein—inert particulate solids, e.g., inorganic materials such as metal colloids, oxidic particles such as $SiO_2$, $TiO_2$, $CaSO_4$, $CaCO_3$, $BaSO_4$, zeolites, iron oxides, ZnO, CoO, $CrO_2$, $ZrO_2$, fluoroapatites and hydroxyapatites, and fine carbon black, or organic materials, such as colloidal dye aggregates. The size of the particulate solids is generally situated within the range from 0.5 to 400 nm, preferably in the range from 1 to 250 nm, and with particular preference in the range from 10 nm to 200 nm. The size of the emulsion droplets is tailored to the size of the particulate solids that are to be encapsulated.

With polymerization reactions in osmotically stabilized nonaqueous miniemulsions, it is possible to achieve efficient embedding of particulate solids into the shell of polymerization products. Preferably at least 60%, with particular preference at least 80%, more preferably still at least 90%, and most preferably at least 95% of the particulate solids are embedded. The dispersions obtained by polymerization may be filmed homogeneously, with the resultant films exhibiting high mechanical stability and acid resistance. Owing to the homogeneous encapsulation, the resultant nanohybrid particles may be used, for example, for paints or coatings with a high coloristic efficiency.

The invention further provides a method of conducting inorganic polymerizations in nonaqueous miniemulsions which is characterized in that a miniemulsion of at least one of the reactants of an inorganic polymerization is produced and is reacted.

An inorganic polymerization in the sense of the present invention is a polymerization in which at least one inorganic reactant is used and/or one inorganic reaction product is obtained. Examples of such inorganic polymerizations are the preparation of metal salt particles, metal oxide particles or metal sulfide particles.

In one embodiment of the method, a miniemulsion is formed from a disperse phase of an apolar reactant in a continuous polar organic phase, e.g., formamide, dimethylformamide, dimethylacetamide and/or dimethyl sulfoxide. The polymerization is then initiated by adding one or more further reactants by way of the continuous phase and/or in the form of a second miniemulsion. One example of this embodiment is the preparation of metal oxide particles from organometallic precursor compounds and water, in which water can be added by way of the continuous phase.

In another embodiment of the invention, an aqueous or nonaqueous miniemulsion is formed from a disperse phase of a polar reactant in a continuous apolar organic phase which is substantially immiscible with the disperse phase. Here again, the polymerization may be initiated by adding one or more further reactants by way of the continuous phase and/or in the form of a second miniemulsion. An example of this embodiment is the preparation of metal sulfide particles in which a miniemulsion of an aqueous solution of polar precursors, e.g., metal salts, in an apolar organic phase is produced, then a second miniemulsion containing sulfide ions is added, and these miniemulsions are mixed by applying corresponding shear fields and stimulated to undergo droplet exchange.

In the conduct of inorganic polymerizations, it is preferred to add surfactants and/or osmotically stabilizing components (in the amounts indicated before) in order to stabilize the miniemulsions. The other preferred features in the context of the above-described organic polymerizations, as well, are transferable to the conduct of inorganic polymerizations.

Furthermore, the invention is to be illustrated by means of the figures and examples included herein.

EXAMPLE

Example 1

Figure 1:
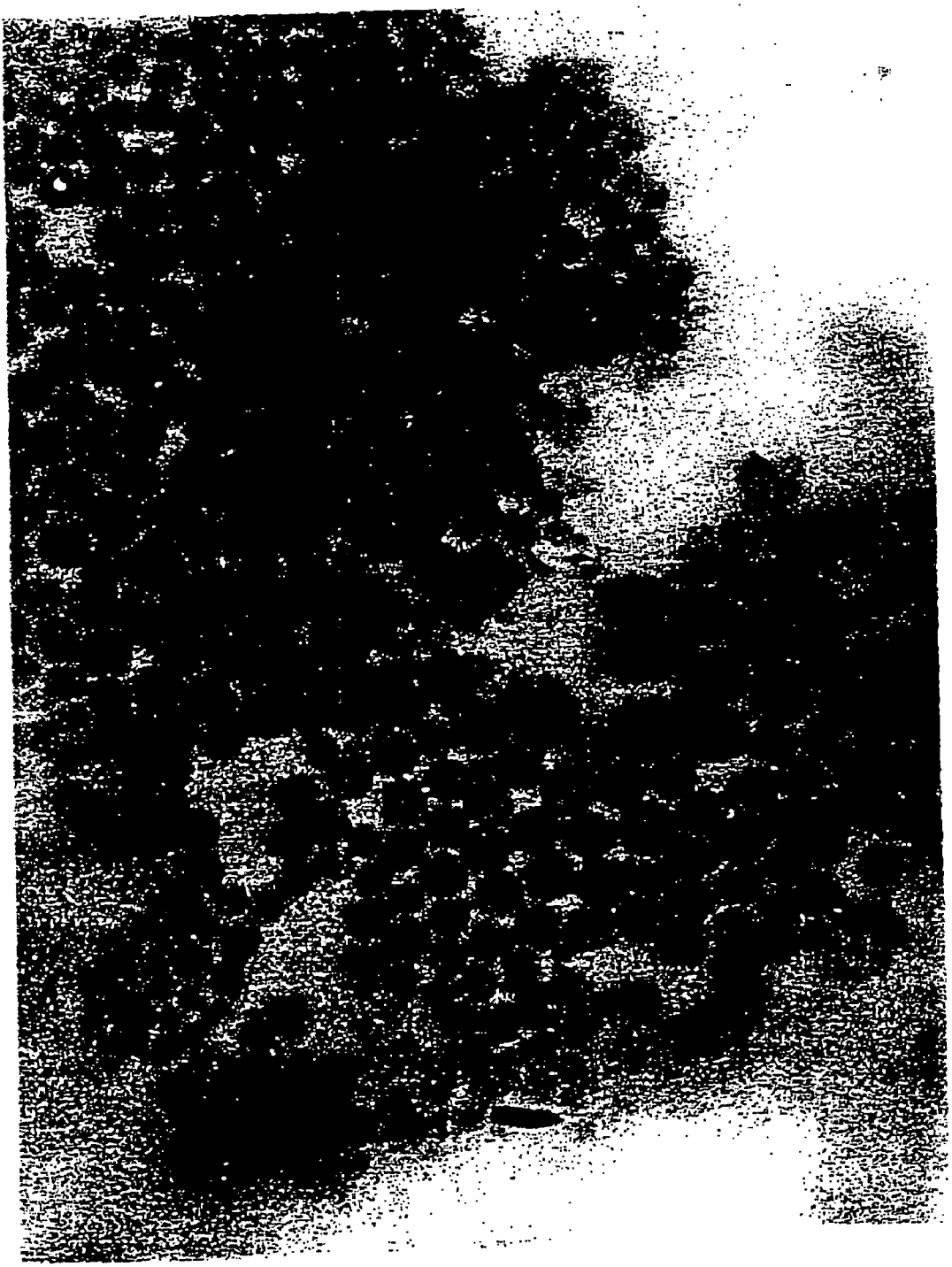
FIG. 1 shows an electron micrograph of PbS particles prepared by the method of the invention.

1 g of acrylic acid was admixed with 60 mg of water and added to a solution of 9 g of cyclohexane and 250 mg of the surfactant KLE3729 (Goldschmidt AG). After the mixture had been stirred for 1 h at the highest magnetic stirrer setting, it was miniemulsified using a rod-type ultrasonicator (Branson Sonifier, W400 Digital, Amplitude of 70%) for 60 s. The miniemulsion was heated to 65° C. and the polymerization was initiated with 50 mg of azobisisobutyronitrile (AIBN). After 12 h, complete conversion was reached.

The particle size was measured using a Nicomp Particle Sizer (Model 370, PSS, Santa Barbara, USA) at a fixed scatter angle of 90°. The molecular weights of the polymers were determined by means of GPC analysis, carried out using a P1000 pump and a UV1000 detector (Thermo Separation Products) at a wavelength of 260 rim with 5 $\mu$m 8×300 mm SDV columns with $10^6$, $10^5$, and $10^3$ angstroms respectively (Polymer Standard Service) in THF with a flow rate of 1 ml/min at 30° C. The molecular weights were calculated on the basis of a calibration relative to the standards.

Electron micrographs were taken using a Zeiss 912 Omega electron microscope at 100 kV. The diluted particle dispersions were applied to a 400 mesh carbon coated copper grid and left to dry.

The average particle size of the resulting dispersion was approximately 50 nm.

Example 2

In accordance with the instructions of example 1, acrylic acid to which diethylene glycol diacrylate (DEGDA) had been added (degree of crosslinking 1:40) was polymerized. Here again, stable particles in the form of hydrogels were obtained.

The result of this experiment is shown in table 1.

Example 3

Instead of cyclohexane, hexadecane was used as the dispersion medium. In accordance with the instructions described in example 1, dispersions were prepared.

The result of this experiment is shown in table 1.

Example 4

The amount of surfactant in example 3 was varied. It was possible to formulate stable inverse miniemulsions in the range from 2 to 100 w % surfactant, preferably from 10 to 50 w % surfactant. The indication of the amount of surfactant in "w %" refers to the weight of the monomer and, respectively, of the resulting polymer.

The results are shown in table 1.

Example 5

Instead of KLE3927, the surfactants Span 80, $C_{18}E_{10}$, and AOT were used. Here too, it was possible to obtain polymer dispersions.

Example 6

Instead of acrylic acid, other hydrophilic monomers such as hydroxymethyl methacrylate (HEMA), acrylamide, and isopropylacrylamide, for instance, were polymerized.
 a) 3 g of hydroxymethyl methacrylate were admixed with 125 mg of water, added to a solution of 25 g of cyclohexane and 300 mg of the surfactant KLE3729, and stirred for 1 h at the highest magnetic stirrer setting. In accordance with the instructions described in example 1, a miniemulsion was prepared and reacted. The particle size of the resulting polymer dispersion was approximately 130 nm (see table 2).
 b) 3 g of acrylamide or isopropylacrylamide were admixed with 4 mg of water, added to a solution of 32 g of cyclohexane or hexane, respectively, and 500 mg of the surfactant KLE3729, and stirred for 1 h at the highest magnetic stirrer setting. In accordance with the instructions described in example 1, a miniemulsion was prepared and reacted. The particle size of the resulting dispersion was approximately 90 nm (see table 2).

It was also possible to produce dispersions following variation of the dispersing media, surfactants, surfactant amounts, and the initiator (see table 2).

Example 7

6 g of styrene and 250 mg of hexadecane (HD) were added to a solution of 24 ml of formamide and 72 mg of sodium dodecyl sulfate and mixed for 1 h with the magnetic stirrer setting on full. Using a rod-type ultrasonicator (1 min, amplitude of 90%), a miniemulsion was prepared. The polymerization was conducted at 72° C. using 120 mg of $K_2S_2O_8$ (KPS) as initiator. After 6 h, the reaction was at an end. Highly stable polymer dispersions in the formamide organic medium were obtained.

When the amount of surfactant was increased to up to 500 mg it was found that the particle size can be adjusted by way of the amount of surfactant.

When using the nonionic surfactant Lutensol AT50 (amounts 125–1000 mg), it was also possible to produce stable polymer dispersions having particle sizes of between 70 and 250 nm.

The results are shown in table 3.

Example 8

Instead of formamide, glycol is used as the dispersion medium. Otherwise, the procedure described in example 7 was followed. Stable dispersions were obtained which had a much larger particle size than the corresponding formamide dispersions.

The results are shown in table 4.

Example 9

Hydrolysis-sensitive monomer substances such as glycyl methacrylate, for example, were polymerized in accordance with the instructions described in example 7.

Example 10

In accordance with the instructions described in example 7, a polymer dispersion was prepared in dimethylacetamide (DMA).

Example 11

1 g of titanium(IV) isopropoxide was added to a solution of 10 ml of formamide and 130 mg of Lutensol AT50 and mixed for 1 h with the magnetic stirrer setting on full. Using a rod-type ultrasonicator (1 min, amplitude of 90%), a miniemulsion was prepared. By careful addition of a 10% strength aqueous formamide solution, stable $TiO_2$ dispersions were prepared.

Example 12

Two miniemulsions were formulated, with one miniemulsion containing droplets with heavy metal salts, e.g., Pb, Zn or Cd salts, in the form of acetates, for example, and the other miniemulsion containing droplets with $Na_2S$. After mixing, the systems were subjected to shearing, and stable metal sulfide dispersions were obtained.

1. Preparation of a PbS Dispersion $1^{st}$ miniemulsion: 270 mg of $PbNO_3$ were dissolved in 1 ml of water (final concentration 1 M). The salt solution was added to a mixture of 125 mg of surfactant (KLE3729 or Span®80) and 10 g of cyclohexane and stirred for an hour at the highest magnetic stirrer setting. Miniemulsification was carried out using a rod-type ultrasonicator (Branson Sonifier, W400 Digital, amplitude of 70%) for 60 s.

2nd miniemulsion: 238 mg of $Na_2S$ were dissolved in 1 ml of water (final concentration 2 M). The salt solution was added to a mixture of 125 mg of surfactant (KLE3729 or Span®80) and 10 g of cyclohexane and stirred for an hour at the highest magnetic stirrer setting. Miniemulsification was carried out using a rod-type ultrasonicator (Branson Sonifier, W400 Digital, amplitude of 70%) for 60 s.

The two miniemulsions were combined and treated with ultrasound for 60s. The particle size was approximately 130 nm when using KLE3729 and approximately 50 nm when using Span 80. FIG. 1 shows the PbS particles when using KLE3729.

2. Preparation of a $BaSO_4$ Dispersion $1^{st}$ miniemulsion: 37.5 mg of $BaCl_2$ were dissolved in 1.5 ml of water (final concentration 0.1 M). The salt solution was added to a mixture of 250 mg of surfactant (Aerosol OT or Span®80) and 6 g of cyclohexane and stirred for an hour at the highest magnetic stirrer setting. Miniemulsification was carried out using a rod-type ultrasonicator (Branson Sonifier, W400 Digital, amplitude of 70%) for 60 s.

2nd miniemulsion: 21 mg of $Na_2SO_4$ were dissolved in 1.5 ml of water (final concentration 0.1 M). The salt solution was added to a mixture of 250 mg of surfactant (Aerosol OT or Span®80) and 6 g of cyclohexane and stirred for an hour at the highest magnetic stirrer setting. Miniemulsification was carried out using a rod-type ultrasonicator (Branson Sonifier, W400 Digital, amplitude of 70%) for 60 s.

Figure 2:
FIGS. 2 and 3 show electron micrographs of $BaSO_4$ particles prepared by the method of the invention, immediately following their formation (FIG. 2) and after 6-day maturation (FIG. 3).
Figure 3:
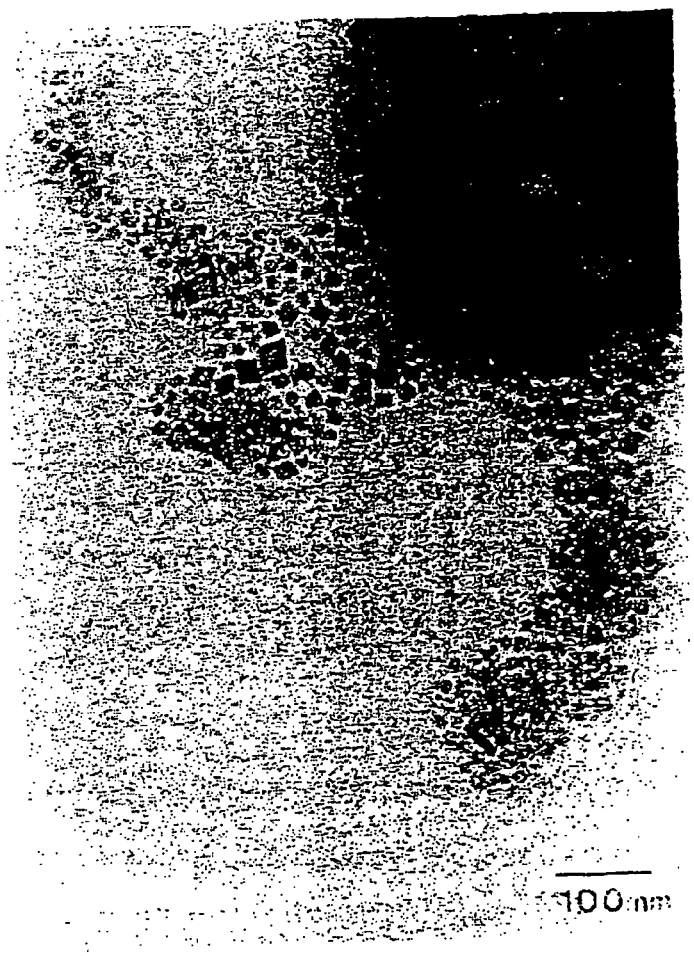

The two miniemulsions were combined and treated with ultrasound for 60 s. The particle size was approximately 15 nm directly following ultrasound treatment and approximately 30 nm after 6-day maturation. FIG. 2 shows particles directly after the ultrasound treatment, FIG. 3 after 6-day maturation.

TABLE 1

| Monomer | Continuous phase | | Emulsifier | Hydrophobe/hydrophile | | Initiator | | Particle size (nm) |
|---|---|---|---|---|---|---|---|---|
| Acrylic acid | 1 g HD* | 9 g | KLE3729 | 500 mg $H_2O$ | 60 mg | AIBN | 40 mg | 58 |
| Acrylic acid + DEGDA* | 1 g HD | 9 g | KLE3729 | 500 mg $H_2O$ | 58 mg | AIBN | 51 mg | 53 |
| Acrylic acid + DEGDA | 1 g HD | 9 g | KLE3729 | 254 mg $H_2O$ | 78 mg | AIBN | 52 mg | 50 |
| Acrylic acid + DEGDA | 1 g HD | 10 g | KLE3729 | 127 mg $H_2O$ | 85 mg | AIBN | 50 mg | 78 |
| Acrylic acid + DEGDA | 1 g CH* | 11 g | KLE3729 | 126 mg $H_2O$ | 72 mg | AIBN | 50 mg | 78 |
| Acrylic acid + DEGDA | 1 g CH | 9 g | KLE3729 | 253 mg $H_2O$ | 76 mg | AIBN | 50 mg | 50 |

*HD: Hexadecane; CH: cyclohexane, DEGDA: diethylene glycol diacrylate (molar ratio 1:80)

TABLE 2

| Monomer | Continuous phase | | Emulsifier | | Hydrophobe/hydrophile | Initiator | | Particle size (nm) |
|---|---|---|---|---|---|---|---|---|
| Acrylamide in H₂O | 3 g 4 g | Hexane | 32 g | Span80 | 513 mg | AIBN in hexane hexane | 80 mg 5 ml | 85/265 |
| Acrylamide in H₂O | 3 g 4 g | CH | 32 g | KLE3729 | 500 mg | AIBN in CH | 100 mg | 91 |
| Acrylamide in H₂O | 3 g 4 g | CH | 32 g | KLE3729 | 250 mg | AIBN in CH | 100 mg | 101 |
| Acryamide in H₂O | 3 g 4 g | CH | 32 g | KLE3729 | 125 mg | AIBN in CH | | 138 |
| Isopropylacrylamide in H₂O | 1.5 g 7.5 g | CH | 32 g | KLE3729 | 500 mg | AIBN in CH | | 91 |
| HEMA | 3 g | CH | 25 g | KLE3729 | 300 mg H₂O | 125 mg PEGA200 | 64 mg | 129 |
| HEMA | 3 g | CH | 25 g | KLE3729 | 500 mg H₂O | 125 mg PEGA200 | 100 mg | 102 |
| HEMA | 3 g | CH | 25 g | KLE3729 | 500 mg H₂O | 125 mg AIBN | 60 mg | 78 |
| HEMA | 2 g | HD | 9 g | KLE3729 | 510 mg H₂O | 60 mg PEGA200 | 108 | 84 |

CH: Cyclohexane, HD: Hexadecane; HEMA: Hydroxyethyl methacrylate

TABLE 3

| Monomer | | Continuous phase | Emulsifier | Hydrophobe/hydrophile | Initiator | Particle size (nm) |
|---|---|---|---|---|---|---|
| Styrene | 6 g | Formamide | 24 ml SDS | 125 mg HD* | 250 mg KPS* | 120 mg | 251 |
| Styrene | 6 g | Formamide | 24 ml Lutensol AT50 | 507 mg HD* | 266 mg KPS | 120 mg | 71 |
| Styrene | 6 g | Formamide | 24 ml SDS | 74 mg HD | 250 mg KPS | 120 mg | 220 |
| Styrene | 6 g | Formamide | 24 ml SDS | 252 mg HD | 270 mg KPS | 121 mg | 183 |
| Styrene | 6 g | Formamide | 24 ml SDS | 502 mg HD | 252 mg KPS | 121 mg | 188 |
| Styrene | 6 g | Formamide | 24 ml Lutensol AT50 | 126 mg HD | 279 mg KPS | 120.5 mg | 253 |
| Styrene | 6 g | Formamide | 24 ml Lutensol AT50 | 252 mg HD | 280 mg KPS | 120 mg | 138 |

*HD: hexadecane; KPS: $K_2S_2O_8$

TABLE 4

| Monomer | | Continuous phase | | Emulsifier | Hydrophobe/hydrophile | Initiator | | Particle size* (nm) |
|---|---|---|---|---|---|---|---|---|
| Styrene | 6 g | glycol | 27.6 g | Lutensol AT50 | 503 mg HD** | 264 mg KPS** | 120 mg | 386 |
| Styrene | 6 g | glycol | 40 g | SDS | 50 mg HD | 259 mg KPS | 122 mg | —*** |
| Styrene | 6 g | glycol | 40 g | SE3030 | 2 g HD | 261 mg KPS | 120 mg | 144 |
| Styrene | 6 g | glycol | 24 g | PEO/PPO | 1 g HD | 250 mg KPS in glycol | 122 mg | 104 |

*diluted with water
**HD: hexadecane; KPS: $K_2S_2O_8$
***not measured

What is claimed is:

1. A method of conducting polymerizations in nonaqueous miniemulsions,
comprising producing a nonaqueous miniemulsion comprising reactants of a polymerization in a nonaqueous fluid dispersing medium, a surfactant and an osmotically stabilizing component, and polymerizing said reactants to yield a polymerization product, wherein said miniemulsion contains not greater than 10% by weight water, wherein a miniemulsion is formed from a disperse phase of polar reactants in a continuous apolar organic phase and wherein said osmotically stabilizing component is a hydrophilic substance, wherein the average particle size of the polymerization product is from 30 to 600 nanometers.

2. The method as claimed in claim 1, wherein the polymerization is selected from addition polymerization reactions, polyaddition reactions, and polycondensation reactions.

3. The method as claimed in claim 2, wherein the polymerization comprises an addition polymerization of acrylic or styrene monomers.

4. The method as claimed in claim 2, wherein the polymerization comprises a polyaddition of polyfunctional epoxides with at least one of hydroxy, amino and thiol compounds.

5. The method as claimed in claim 2, wherein the polymerization comprises a polyaddition of polyfunctional isocyanates with at least one polyfunctional hydroxy or amino compounds.

6. The method as claimed in claim 2, wherein the polymerization comprises a polycondensation of polyfunctional carboxylic acids with polyfunctional hydroxy or amino compounds.

7. A method of conducting polymerizations in nonaqueous miniemulsions,
comprising producing a nonaqueous miniemulsion comprising reactants of a polymerization in a nonaqueous fluid dispersing medium, a surfactant and an osmotically stabilizing component, and polymerizing said reactants, wherein said miniemulsion is formed from a disperse phase of apolar reactants in a continuous polar organic phase and wherein said osmotically stabilizing component is a hydrophobic substance.

8. The method as claimed in claim 7, wherein the osmotically stabilizing component is added in an amount of from 0.1 to 40% by weight based on the overall weight of the emulsion.

9. The method as claimed in claim 8, wherein the average particle size of the emulsion is situated in the range from 30 to 600 nm.

10. The method as claimed in claim 9, wherein an emulsion is produced which is critically stabilized or thermodynamically stable with respect to an alteration in particle size.

11. The method as claimed in claim 10, wherein the emulsion further comprises dispersed therein particulate solids.

12. The method as claimed in claim 11, wherein the polymerization takes place without substantial alteration in the particle size.

13. The method of claim 1, wherein said hydrophilic substance is water or a salt.

14. A method of conducting polymerizations in nonaqueous miniemulsions,
comprising producing a nonaqueous miniemulsion having a water content not greater than 10% by weight comprising reactants of a polymerization in a nonaqueous fluid dispersing medium, a surfactant and a hydrophilic osmotically stabilizing agent selected form the group consisting of water, a salt or a combination thereof in an amount sufficient to osmotically stabilize the miniemulsion, and polymerizing said reactants to yield a polymerization product having an average particle size of from 30 to 600 nanometers wherein the emulsion further comprises dispersed therein particulate solids.

15. The method as claimed in claim 14, wherein the polymerization is selected from addition polymerization reactions, polyaddition reactions, and polycondensation reactions.

16. The method as claimed in claim 14, wherein the polymerization comprises an addition polymerization of acrylic monomers.

17. The method as claimed in claim 14, wherein the polymerization comprises a polyaddition of polyfunctional epoxides with at least one of hydroxy, amino and thiol compounds.

18. The method as claimed in claim 14, wherein the polymerization comprises a polyaddition of polyfunctional isocyanates with at least one polyfunctional hydroxy or amino compounds.

19. The method as claimed in claim 14, wherein the polymerization comprises a polycondensation of polyfunctional carboxylic acids with polyfunctional hydroxy or amino compounds.

20. The method as claimed in claim 14, wherein an emulsion is produced which is critically stabilized or thermodynamically stable with respect to an alteration in particle size.

21. The method as claimed in claim 14, wherein the polymerization takes place without substantial alteration in the particle size.

* * * * *